Patented July 14, 1936

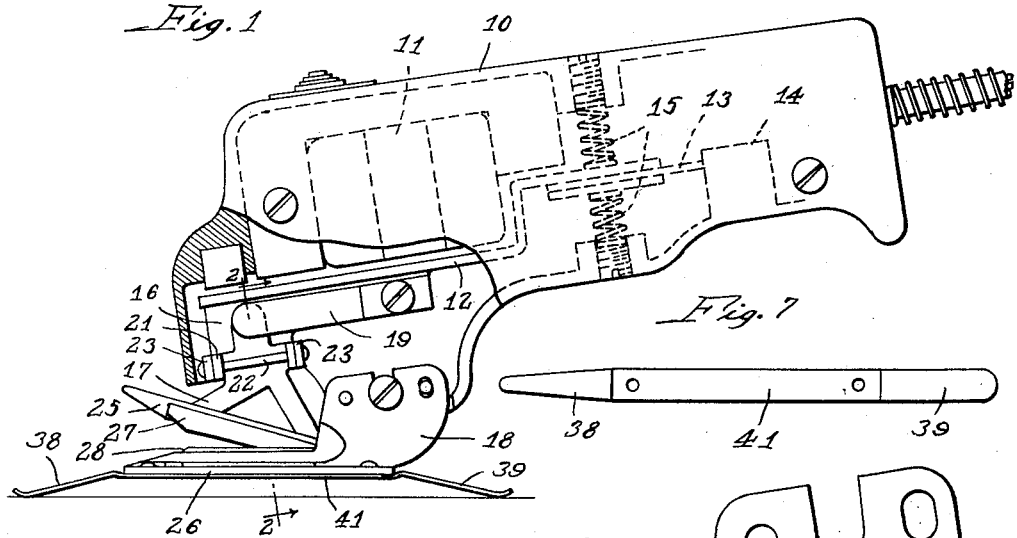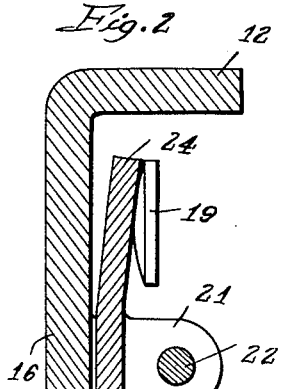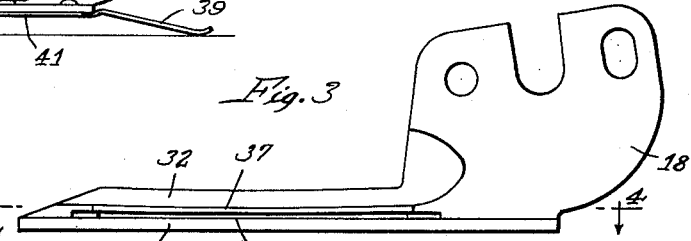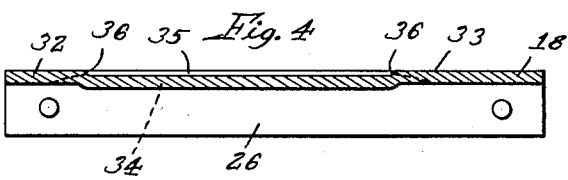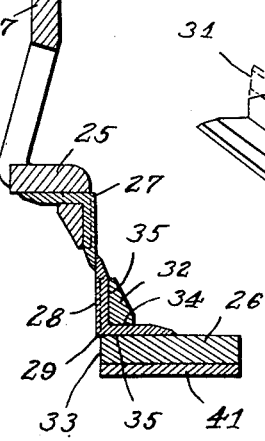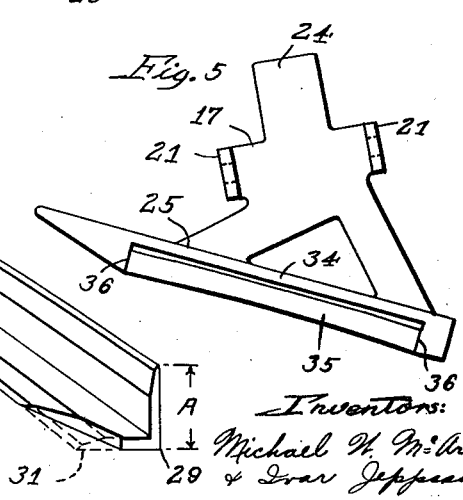

2,047,483

UNITED STATES PATENT OFFICE 2,047,483

SCISSORS AND THE LIKE

Michael W. McArdle and Ivar Jeppsson, Chicago, Ill., assignors to Chicago Flexible Shaft Company, Chicago, Ill., a corporation of Illinois Application November 14, 1934, Serial No. 752,914

20 Claims. (Cl. 164—81)

This invention relates to scissors and shears and has more particular reference to electrically operated scissors. The invention also relates to the shearing cutters and to the manner in which they are supported.

One of the objects of the present invention is to provide an improved electric scissors, particularly with the view to locating the bite of the shearing blades in close proximity to the surface on which the material being cut, as well as the scissors itself, is supported, the purpose of this being to improve the cutting and operating conditions. For example, where the electric scissors is used for cutting fabrics or sheet material to follow a superimposed pattern, it is desired not to unduly lift the material in its passage to the shearing blades because this has a tendency to displace the pattern with respect to the material and impairs accuracy in cutting. According to the present invention the bite of the shearing blades is comparatively low and is conducive to smooth, quick and accurate cutting.

Another object of our invention is the provision of novel shearing cutters as well as novel means for supporting these cutters, the cutters being characterized by their comparatively narrow vertical dimension, which is an important factor in supporting them in a low position, also their double edge blades which permit reversibility for increasing the wearing life of the cutters. Another feature is the absence of fastening means penetrating or passing through the cutters, thus permitting greater strength and rigidity in blades of small dimensions and also eliminating extraneous fastening means, such as screws, pins, and the like.

Another object is to provide a shearing cutter having a right angle cross-section, each angular portion of which constitutes a shearing blade. A further object is to provide a mounting for angular cutters of this kind permitting reversibility of the cutters to position either blade of a cutter in shearing relation with a blade of the other cutter.

Another object is to provide an improved resilient guide and support for the lower cutter holder of an electric scissors which absorbs vibration of the operating mechanism and also aids in supporting the cutters in the low position above described.

A further object is to provide improvements of the character described, which improvements may be manufactured economically and will serve in a practical and satisfactory manner for the purposes intended.

Other objects and attendant advantages will be appreciated by those skilled in this art as the invention becomes better understood by reference to the following description when considered in connection with the accompanying drawing, in which—

Figure 1 is a side elevation, partly broken away in section, showing an electric scissors embodying our invention;

Fig. 2 is an enlarged vertical section taken substantially on the section line 2—2 of Figure 1;

Fig. 3 is an enlarged side elevation of the lower cutter holder, removed from its mounting;

Fig. 4 is a plan section taken on the line 4—4 of Fig. 3;

Fig. 5 is an enlarged side elevation of the upper cutter holder, removed from its mounting;

Fig. 6 is a perspective view of one of the shearing blades; and

Fig. 7 is a plan view of the resilient guide and shock absorber, removed from the scissors.

Our invention, as noted in the preface, has several phases. In the preferred embodiment shown in the drawing, it is applied to an electric scissors of the type described in Patent No. 1,996,813, issued April 9, 1935 to Ivar Jeppsson. The invention, however, is not limited to use with an electric scissors of the kind described but is applicable to any electrically operated scissors or shears. It is also applicable in some of its phases to scissors and shears generally, as will be readily understood by those skilled in this art.

The electric scissors referred to, shown in Figure 1, comprises a suitable casing designated generally by 10, shaped to enclose the cutter operating means and also to provide a hand grip for bodily manipulating the scissors when motion thereof is desired for guiding the shearing blades in the cutting action and for following patterns and the like. Within the casing is mounted suitable vibrating means for imparting motion to the cutting stroke as, for example, to one of the shearing blades. According to the present invention, any suitable operating means may be employed, electrical or otherwise, for operating one or both of the shearing blades. In the present example, an electromagnet, designated generally by 11, actuates an armature 12 in rapid vibrations. This armature is supported at one end by means of a flat spring 13 fixed at 14 to the casing and is confined intermediate its ends between coiled compression springs 15 which have a tuning function and also serve to impart the shearing stroke, as described in the Jeppsson patent above mentioned. The outer end of the armature bar has a depending vertical portion 16 on which is mounted an upper cutter holder, designated generally by 17. This cutter holder, therefore, vibrates vertically with the armature bar and thereby operates its shearing blade (which will be presently described) in shearing relation with a lower blade which is carried on a lower cutter holder designated generally by 18. In this instance, the lower cutter holder is relatively fixed with respect to, but removable from, the casing 10. The upper cutter holder is pivotally mounted on the vertical portion 16 of the armature bar so that it may have an independent lateral tilting motion under the influence of a spring 19 for the purpose of yieldingly urging the upper blade laterally against the face of the lower blade, as claimed in said Jeppsson patent. The upper blade holder has laterally turned ears 21 pivoted on a pin 22 in turn supported on ears 23 turned laterally from the portion 16 of the armature bar. The free end of the spring 19 exerts pressure laterally against the upstanding end 24 of the upper cutter holder tending to urge the latter in a counter-clockwise direction about the pivot 22, viewing Fig. 2, whereby to urge the blade on the lower end of the cutter holder laterally against the blade carried by the lower cutter holder. As shown in Figures 1 and 5, the upper cutter holder has a forwardly and upwardly inclined blade holding portion designated generally by 25, which serves to carry the upper cutter with its shearing blade in shearing relation to the lower shearing blade. The lower blade holder 18 is suitably attached to the casing 10 with capacity for removal therefrom and has a forwardly extending blade holding portion designated generally by 26, which is approximately horizontal when in the working position shown in Figure 1.

The upper and lower shearing cutters, designated generally by 27 and 28, respectively, are identical in construction and a description of one will suffice. As shown clearly in Fig. 2, each cutter has a cross-section in the form of an angle bar. The angles of each bar provide a pair of shearing blades at right angles with respect to each other. The cutter is of suitable steel, such, for example, as razor blade steel, formed to the cross-sectional shape shown. The cutter will be suitably hardened and the longitudinal edges of the blades remote from the angle will be ground in any suitable manner. In shaping the material, we prefer to provide a comparatively sharp square corner 29 so as to provide a thrust seat practically to the face of each blade to seat against a complemental face on the work holder as close to the cutting plane of the blades as possible in order to obtain a more secure and stable support for the blade. Each blade is cut away on an incline at diagonally opposite corners, as at 31, Fig. 6, to provide a bevel edge at the entrance to the throat or bite of the blades. In order to convey a better understanding of the size and proportions of the cutters used in the present application of our invention, it will be noted that in actual practice the face of each cutting blade designated by A, Fig. 6, is $\frac{3}{32}$ of an inch and the sheet material from which the cutter is formed is approximately .028 of an inch. These dimensions, as stated, are merely illustrative of one working embodiment as applied to an electric scissors which is shown approximately full size in Figure 1.

Referring now to the mounting of the cutters on the upper and lower cutter holders, it should be noted that the mounting is identical in each case. Reference will be made, therefore, more particularly to the construction of the lower cutter holder shown in Figs. 2, 3 and 4. It will be noted that the horizontal blade portion 26 has, along one edge, an upturned portion 32 providing a flat vertical face 33 coplanar with the working plane of the blades. This upstanding portion 32 is slotted longitudinally at 34 with the bottom wall 35 of the slot coplanar with the top surface of the supporting portion 26, the slot being of just sufficient width to receive a blade. The face 33 of the upstanding portion 32 is recessed at 35 throughout the length of the blade, this recess intersecting the slot, as shown in Figs. 2 and 4. The ends 36 of this recess constitute abutments for the ends of the cutter and retain the cutter against endwise displacement. In forming the recess 35 and abutments 36, a stamping die may be used which laterally displaces a portion of the upright portion 32, as shown in Fig. 4, giving accurate spacing of said abutments as well as an accurate seat for the vertical portion of the blade. The slot 34 may be formed by a milling cutter operating from the side opposite the face 33, the cut being of sufficient depth to intersect the recess 35, as shown in Fig. 4. It will thus be seen that the cutter holder is recessed, as by means of the slot 34 and the recess 35, to receive and hold the cutter with its horizontal blade seated throughout its face against the top of the holder portion 26 and its vertical blade seated the greater part of its length against the face 35 and confined at its ends against the abutments 36. With but very little pressure laterally against the vertical blade it will be effectively retained on the holder to withstand the forces and stresses imposed during operation. Such lateral pressure is exerted by the upper blade under the influence of the spring tension above described, it being observed that the upper and lower blades in the working position lie face to face, as shown in Fig. 2, and that the relative motion between the blades in the shearing operation is coplanar with these faces, which we may for convenience refer to as the working plane. It will be noted, viewing Fig. 2, that there are no blade fastening means or obstructions projecting into or overlapping the working plane above referred to, and that the working face of each blade is flush with the other end free to move in such working plane without obstruction. Likewise, the material passing through the cutters is not obstructed by fastening means projecting from the face of the cutters. It will be further noted that the vertical shearing thrust is effectively resisted by reason of the fact that the end thrust support for the vertical blade is carried approximately to the face of the blade, thus overcoming any tilting moment as the result of the shearing thrust. In order to more securely retain the cutter on the holder, the medial portion 37 of the vertical portion 32 is depressed, as shown in Fig. 3, to provide increased frictional engagement with the blade inserted in the slot.

The lower cutter holder is equipped with improved means for supporting and guiding the scissors during operation, consisting of resilient legs 38 and 39 projecting from the front and rear, respectively, of said cutter holder. In the preferred embodiment, these legs are of spring steel formed at the ends of a flat plate 41 secured to the under side of the cutter holder portion 26. Each leg is curved upwardly at its end so as to slide freely over the surface on which the material being cut and also the scissors are supported. The projecting leg 38 also serves as a pilot guide for raising the material and guiding it to the cutters. It will be noted, however, that the material is only slightly raised in its passage to the cutters and that the bite of the cutters is maintained comparatively close to the supporting surface referred to. This is desirable, as above explained, because it promotes smooth, quick and accurate cutting and avoids disturbing a pattern superimposed on the material when the scissors are applied to a use of this kind. The resilient legs also serve to absorb the vibration incidental to the cutter operating means and thus promote quiet operation. With this construction, the scissors as a whole has a floating support and yet the cutters are maintained in a definite relationship to the material with no appreciable rise and fall incidental to irregularities in handling the scissors during the cutting operation.

It will be apparent that in use, either the electric scissors may remain at rest in the position shown, in which case the material would be fed to the cutters, or the scissors may be moved bodily along the supporting surface so that the scissors traverse the material, and in either case the scissors may be directed or guided to follow a pattern or line. It will also be apparent that the cutters may be easily removed and replaced and that each cutter is reversible to place either blade in the working position. The blades are removable either by swinging the upper blade holder laterally to separate the cutters sufficiently to permit withdrawal of each cutter from its holder, or by removing the lower holder which is quickly detachable from the casing, such removal of the lower holder obviously affording entire freedom for removing the respective cutters.

It will also be apparent that minor changes in the details of construction and arrangement of the parts may be made without departing from the spirit of the invention as set forth in the appended claims, in which—

We claim:

1. Scissors and the like having shearing cutters each in the form of a right angle bar the two arms of which form blades sharpened at their edges remote from the angle, the cutters being supported with a blade of each in cutting relationship with the blade of the other, and each cutter being reversible to position either blade in cutting relation to a blade of the other cutter.

2. The combination in scissors and the like, of a one-piece shearing cutter, having two blades at right angles to each other and each blade sharpened at its edge remote from the angle.

3. The combination in scissors and the like, of a one-piece shearing cutter, of thin sheet steel formed to provide two blades at right angles to each other, each blade being of comparatively narrow width and sharpened at its edge remote from the angle.

4. The combination in scissors and the like, of a pair of cutter holders, and a shearing cutter for each holder comprising a body of thin sheet metal formed to a right angle cross-section to provide a pair of shearing blades, each blade having a flat shearing face and being sharpened at its edge remote from the angle, each cutter being mounted on a holder with the flat face of one of its blades positioned in shearing relation against the flat face of a blade on the other holder.

5. A scissors or shears having a pair of cutter holders adapted to be relatively moved in a shearing action, and a cutter removably mounted on each holder, each cutter having a pair of blades in angular relation one with respect to the other, the cutters being supported on said holders each with a blade in a working plane for operating in said shearing action, each cutter being reversible on its support to position its other blade in said working plane in shearing relation with the blade of the other cutter disposed in said plane.

6. A scissors or shears as set forth in claim 5, in which each cutter holder is provided with a slot to receive and hold either blade of its cutter with its other blade in cutting position.

7. A scissors or shears as set forth in claim 5, in which each cutter holder is provided with a slot to receive either blade of its cutter with its other blade in cutting position, and means yieldingly urging one of said cutter holders laterally to hold its working blade in shearing engagement with the working blade of the other cutter, said blades and slots being arranged so that the lateral pressure of said cutter holder holds the cutters seated in working position in said slots.

8. In a scissors or shears, a pair of cutters each having flat, narrow blades arranged at right angles to each other, each blade being sharpened at its edge remote from the angle, and means supporting said cutters in shearing relationship with the flat face of a blade of one cutter flush against the flat face of a blade of the other cutter, each cutter being reversible to position either blade in said shearing relationship.

9. In a scissors or shears, a pair of cutters each having flat, narrow blades arranged at right angles to each other, each blade being sharpened at its edge remote from the angle, and means supporting said cutters in shearing relationship with the flat face of a blade of one cutter flush against the flat face of a blade of the other cutter, each cutter being reversible to position either blade in said shearing relationship, said cutters being imperforate, and said cutter supporting means engaging only the exterior of the cutters with no obstruction across the working plane of the blades in said shearing relationship.

10. In a scissors or shears, a pair of cutter holders, each holder having a blade-receiving slot perpendicular to a shearing plane, and a cutter for each holder, each cutter having a pair of blades at right angles to each other, each blade being insertible into the slot of a cutter holder and being held in such slot with its other blade disposed in said shearing plane in cooperative shearing relation with a correspondingly supported blade of the other cutter, the wall of each slot which takes the thrust of the shearing force being extended substantially to the face of the blade in shearing position.

11. In a scissors or shears, shearing cutters each having a right angle cross-section providing a pair of shearing blades, and a holder for each cutter shaped to provide a slot to receive one of the blades and a recess to receive the other blade with the face thereof exposed in the working plane.

12. A scissors or shears as set forth in claim 10, in which one wall of the slot is depressed for frictional holding engagement with the blade.

13. A scissors or shears as set forth in claim 10, in which said recess has an abutment at each end for restraining the cutter from lengthwise displacement from its working position on the holder.

14. Scissors and the like comprising, in combination, shearing cutters, vibratory cutter operating means, a casing for said vibratory means, a cutter support at the bottom of the casing having a horizontally extending blade supporting portion, a pair of resilient legs fixed to and disposed beneath said blade supporting portion, one at the front and the other at the rear thereof, the front leg projecting forwardly and the rear leg projecting rearwardly from said blade supporting portion, the front end of the front leg and the rear end of the rear leg providing widely spaced points of support with respect to the intermediate blade supporting portion adapted to slide on the surface over which the scissors are moved, a vibratory cutter support above the first mentioned cutter support operated by said vibratory means, and cutting blades of comparatively small vertical dimension carried on said cutter supports, said supports, resilient legs, and blades being arranged so that the bite of the blades is located comparatively close to said work supporting surface.

15. Scissors and the like comprising a casing having cutter operating means, and an upper and a lower cutter blade located beneath the casing in cutting relationship, the upper blade only being vibrated by said operating means, and means associated with the lower blade adapted for sliding motion on a work supporting surface for guiding said lower blade with its cutting edge approximately in a horizontal working plane in comparatively close proximity to said surface, said means including a pair of resilient legs, one at the front and the other at the rear of said lower blade, the front legs projecting forwardly and the rear leg rearwardly from said lower blade, the front end of the front leg and the rear end of the rear leg having sliding support on said work supporting surface.

16. A scissors or shears having a manually operable casing equipped with vibratory cutter operating means, a horizontally disposed cutter holder carried by and beneath the casing, a vibratory cutter holder disposed in cooperating relation with and above the first-mentioned cutter holder and operated by said vibratory means, a thin vertical shearing blade of comparatively narrow width mounted on each cutter holder, the lower blade being horizontally disposed and the upper blade being inclined upwardly and forwardly, and a resilient supporting and guiding leg on the front and rear ends respectively of the lower cutter holder arranged to support and guide the blades in a comparatively low position with the bite of the blades in close proximity to the surface on which said legs rest.

17. A scissors or shears comprising a hand operated casing containing cutter vibrating means, a lower cutter holder on the underside of the casing, an upper cutter holder operated by said vibrating means, each cutter holder having an L-shaped recess to receive a shearing cutter, and shearing cutters for said holders, each consisting of a one-piece right angle bar providing angular blades sharpened at their edges remote from the angle, each cutter adapted to be positioned in an L-shaped recess of a holder with one of its blades disposed vertically in shearing relationship with a correspondingly positioned blade of the other cutter.

18. A scissors or shears as set forth in claim 17, in which the L-shaped recess in each cutter holder includes a blade-receiving slot for the horizontally disposed blade, and one of the walls of each slot being normally displaced so as to yieldingly and frictionally engage the inserted blade as a means of retaining it in position.

19. A pair of cooperating shearing cutters adapted for use in electric shears and the like, each cutter having a pair of flat blades in substantially right angle relation, each blade being sharpened at its edge remote from the angle and with cutting relief only at the inner side of the angle, the outer face of each blade being flat, said cutters being adapted for cooperative shearing action with the flat face of a blade of one cutter flush against the flat face of a blade of the other cutter for relative movement in a shearing action coplanar with said coacting faces, and either of said blades being adapted for reversible positioning of its other blade in said coacting relation.

20. In a scissors or shears, a pair of cooperating shearing cutters as set forth in claim 19, each cutter being held in working position by means engaging the flat face of the blade not in shearing position and also engaging the inner side of both blades of the cutter.

MICHAEL W. McARDLE.
IVAR JEPPSSON.